Jan. 7, 1958  L. F. BENDER  2,818,833
MILK PAIL COVER AND PULSATOR ASSEMBLY
Filed Dec. 15, 1954
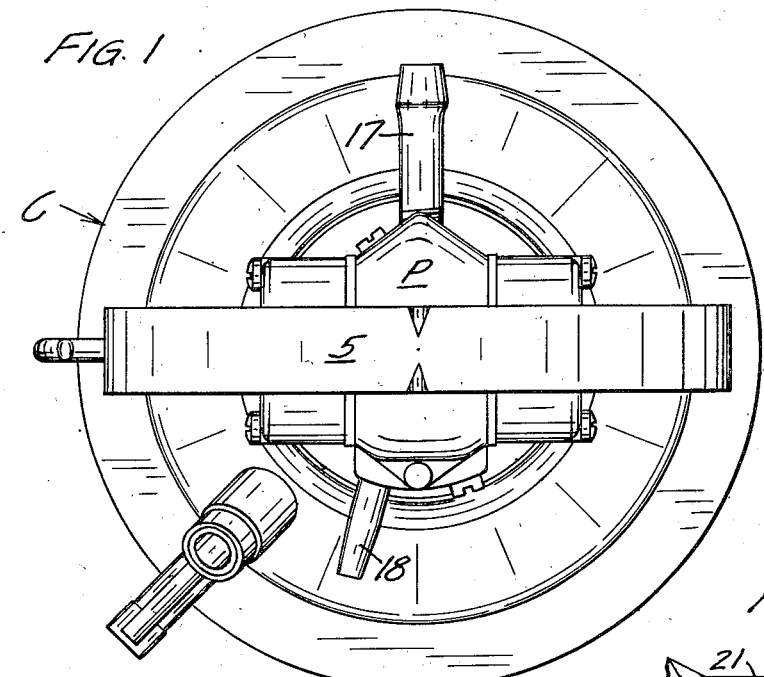
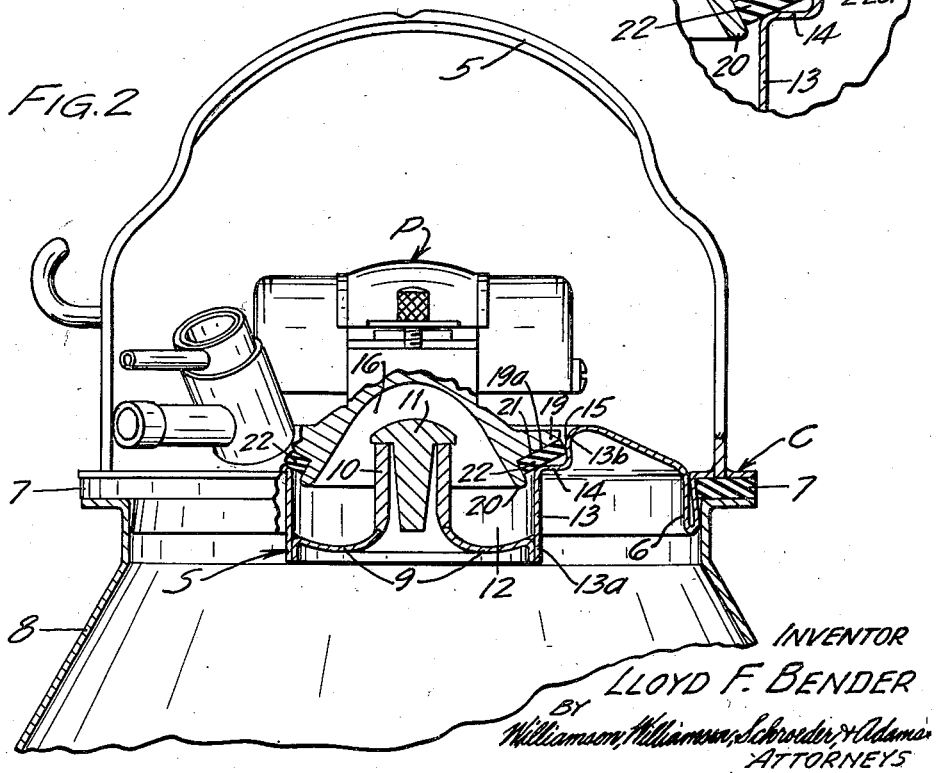
INVENTOR
LLOYD F. BENDER
BY
ATTORNEYS

United States Patent Office 2,818,833
Patented Jan. 7, 1958

2,818,833

MILK PAIL COVER AND PULSATOR ASSEMBLY

Lloyd F. Bender, Hayward, Wis., assignor to National Cooperatives, Inc., Chicago, Ill., and Albert Lea, Minn., a corporation of the District of Columbia Application December 15, 1954, Serial No. 475,513

4 Claims. (Cl. 119—14.46)

This invention relates to milking machines. More particularly, it relates to milking machine pail covers and pulsator assemblies for use in conjunction with milking machines which utilize milk pails for the collection of the milk after it has been withdrawn from the cow instead of using a central milk line under suction.

Many milking machines utilize a large milk pail with an opening at its top within which the milk is collected as it is taken from the cow, while others use a claw assembly connected to a central milk line under suction. It has become common in the former instance to provide a cover or lid for the pail which has the pulsator mounted directly thereupon. In such case the cover or lid must seal the opening of the pail, and the pulsator must be affixed to the lid in sealed fluid communication with the interior of the pail. Mechanical locking means is usually provided to lock the pulsator to the pail lid and in sealed communication with the interior of the pail through an opening in the lid. Such locking means, however, are unsatisfactory in that they frequently become unlocked and the pulsator becomes detached, and in that they are cumbersome, costly and constitute an inconvenience because they must be manually operated each time the pulsator is attached to or detached from the pail lid.

In recent years milking machine pail covers having moisture collecting wells formed in their upper surfaces have been designed for use with such milking machines. My invention is directed toward eliminating the above disadvantages for a well-type milking machine pail cover or lid.

It is a general object of my invention to provide a milking machine pail cover and pulsator assembly having novel and improved combined sealing and attaching means for securing and sealing the pulsator to the cover of the milking machine pail.

A more specific object is to provide a milking machine pail cover and pulsator assembly wherein the means for sealing the pulsator to the cover also constitutes a novel and improved means for securing the pulsator to the cover.

Another object is to provide a novel and improved pulsator having inherent combined sealing and attaching means for securing the pulsator to a well-type milking machine pail cover in a quicker and more efficient manner, such means being substantially less expensive to manufacturing and simpler to operate.

Another object is to provide a pulsator of novel and improved construction having sealing means adapted to cooperate with the well-defining portions of a milk pail cover to seal the pulsator to the milk pail cover along one line of points and to firmly secure the pulsator to the milking machine pail cover along another line of points.

These and other objects and advantages of my invention will more fully appear from the following description made in connection with the accompanying drawings, wherein like reference characters refer to the same or similar parts throughout the several views, and in which:

Fig. 1 is a plan view of one embodiment of my milk pail cover and pulsator assembly;

Fig. 2 is a side view with parts in section and parts broken away; and

Fig. 3 is a fragmentary sectional view on an enlarged scale showing in detail the combined sealing and securing means for holding the pulsator to the well-type milk pail lid.

One embodiment of my invention, as shown in Figs. 1–3, may include a milk pail lid or cover indicated generally as C. This milk pail lid or cover C is similar in construction to that disclosed in my presently pending and allowed application for patent, Serial Number 272,176 filed by me on February 18, 1952, and entitled Milking Machine Pail Lid, which eventually issued on December 21, 1954, as United States Letters Patent No. 2,697,412. As shown, the cover C may include a handle member 5. It is provided with a depending annular flange 6 around which extends an annular gasket 7 which together close off the opening at the top of the milk pail 8 and effect a seal between the cover C and the pail 8.

As shown, the milk pail cover or lid C includes well-defining wall structure indicated generally as S at the central portions of the cover. This wall structure has annularly shaped horizontal portions 9 which converge into a tubular member 10 at the center, the tubular member 10 carrying a valve element 11 loosely in its upper portions in a manner well understood in the art. The wall structure S, which defines the well indicated as 12, includes annular generally upright portions 13 which surround the horizontal portions 9 to cooperatively define the well 12. The upright portions 13 have lower end portions 13a and upper end portions 13b and an intermediate area of the upright portions is formed into a generally horizontal annular seat 14. The upper end portions 13b extend inwardly a short distance just above the seat 14 to provide a slightly inwardly extending bead 15, which as best shown in Figs. 2 and 3, is disposed slightly above the horizontal seat 14.

The assembly also includes a pulsator indicated generally as P, this pulsator being of the general type well known in the art wherein there is provided an exhaust chamber 16 which is open at its lower end portion and communicates with the vacuum ducts 17 and 18, the former of which is connected in operation to the main suction line, and the latter of which is connected in operation to the inflations. The wall structure which forms the exhaust chamber 16 has an outwardly extending annular flange 19 formed on its outer surface a short distance above the lower edge 20 of said wall structure. This flange 19 extends outwardly and upwardly and has a flat underside 19a which cooperatively forms a seat 21 with the portion of the wall structure which extends below the flange 19, as best shown in Figs. 2 and 3.

Resilient sealing means in the form of a rubber ring 22 is located on the seat 21 so as to lie along the underside 19a of the flange 19. This ring 22 is generally rectangular in cross-section, but since it lies along the underside 19a of the flange 19 and fits the lower portion of the wall structure, it too extends upwardly and outwardly. Reference to Figs. 2 and 3 will show that the ring 22 extends upwardly and outwardly to a point beyond the outermost portions of the flange 19 and that the lower outer edge 22a of the ring extends outwardly beyond the rest of the ring.

To assemble the pulsator P and the cover or lid member C, the operator merely positions the pulsator over the well 12 and presses downwardly upon the top of the pulsator whereupon the ring member 22 will snap into the position shown in Figs. 2 and 3. It will be noted that the lower outer edge 22a of the ring 22 engages the upright portions 13 of the wall structure S which defines the well 12 just below the bead 15. It will also be noted that the medial portions of the ring 22 engage the well-defining walls where the seat 14 and the upright wall portions 13a meet to form a seal so as to prevent the passage of air therebetween.

In use the vacuum ducts 17 and 18 are in communication with the interior of the pail 8 via the exhaust chamber 16 and the tubular member 10. The suction to which the interior of the well is subjected is controlled by the pulsator in the conventional manner and the valve element 11 is controlled as a result of variations in suction applied to the interior of the well 12. It will be noted that the seal accomplished by the ring 22 at the point where the upright portion 13a and the seat 14 meet effectively seals the pulsator to the cover member C along a line of points around the well 12. It will also be noted that the ring 22, in addition to performing its normal function of sealing the pulsator to the cover member C, performs the additional function of positively securing the pulsator to the cover member C as a result of the lower outer edge 22a fitting outwardly beneath the bead 15.

Thus it can be readily seen that I have provided a milk pail and cover assembly in which the pulsator can be readily attached or detached from the cover. The pulsator is held securely without any additional mechanical locking means and it is impossible for the securing means to become unlocked or ineffective. A very positive manual force must be exerted upon the pulsator in order to remove the pulsator P from the cover member C after it has been positioned, as shown in Figs. 1, 2 and 3. It will be readily appreciated that the gasket serves as a combined securing and sealing means for the pulsator. It is also readily apparent that the combined sealing and securing means described herein is less expensive to manufacture and more convenient and simple to manufacture.

It will, of course, be understood that various changes may be made in the form, details, arrangement and proportions of the various parts without departing from the scope of my invention.

What is claimed is:

1. In combination with a milk pail lid having a well therein, said well being defined by a depending substantially vertical wall portion having a substantially horizontal ledge at its upper end and a second substantially vertical wall portion extending upwardly from said ledge, a pulsator unit having a lower portion thereof communicating with and depending within said well, the lower portion of said unit which depends within said well including a generally radially directed annular flange having a lower surface portion of generally inverted frusto-conical configuration and a lip concentric with and depending from said frusto-conical surface, a normally flat annular resilient sealing ring of generally rectangular configuration, said sealing ring having its upper surface engaged against said frusto-conical surface and deformed thereby into generally frusto-conical shape with its lower surface engaging against the well defining wall portions afforded by the juncture of said first generally vertical wall portion and said ledge and with its inner surface engaged against and surrounding said lip, and said sealing ring, when deformed into such frusto-conical shape, having its outer edge forcibly engaged against said second generally vertical wall portion of the lid to hold the pulsator unit within said well while the lower surface of the ring effects a seal.

2. The assembly as defined in claim 1 wherein said lip is provided with an outer surface of upright frusto-conical configuration intersecting the inverted frusto-conical lower surface portion of said flange at substantially right angles, the inner surface of said ring being in face-to-face contact with said outer surface of the lip whereby to maintain said ring in deformed frusto-conical shape.

3. The assembly as defined in claim 2 wherein said second substantially vertical wall portion of the well extends radially inwardly adjacent the upper portion thereof, and said outer edge of the sealing ring being engaged against said second vertical wall portion below the upper portion of said second vertical wall portion whereby to engage beneath the innermost portion of said radially inwardly directed upper wall portion.

4. The assembly as defined in claim 1 wherein said second substantially vertical wall portion of the well extends radially inwardly adjacent the upper portion thereof, and said outer edge of the sealing ring being engaged against said second vertical wall portion below the upper portion of said second vertical wall portion whereby to engage beneath the innermost portion of said radially inwardly directed upper wall portion.

References Cited in the file of this patent

UNITED STATES PATENTS

| | | |
|---|---|---|
| 2,502,363 | Babson | Mar. 28, 1950 |
| 2,581,530 | Harstick | Jan. 8, 1952 |
| 2,697,412 | Bender | Dec. 21, 1954 |
| 2,701,659 | Baltosser | Feb. 8, 1955 |

FOREIGN PATENTS

| | | |
|---|---|---|
| 805,609 | France | Aug. 31, 1936 |